(12) United States Patent
Moore et al.

(10) Patent No.: US 9,261,380 B2
(45) Date of Patent: Feb. 16, 2016

(54) INTELLIGENT ADJUSTMENT OF MAP VIEWPORTS AT LAUNCH

(71) Applicants: Bradford A. Moore, San Francisco, CA (US); Christopher Blumenberg, San Francisco, CA (US); Catherine A. Edwards, San Francisco, CA (US); Marcel van Os, San Francisco, CA (US); Patrice O. Gautier, San Francisco, CA (US); Sarah G. Barbour, San Francisco, CA (US)

(72) Inventors: Bradford A. Moore, San Francisco, CA (US); Christopher Blumenberg, San Francisco, CA (US); Catherine A. Edwards, San Francisco, CA (US); Marcel van Os, San Francisco, CA (US); Patrice O. Gautier, San Francisco, CA (US); Sarah G. Barbour, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 264 days.

(21) Appl. No.: 13/842,405

(22) Filed: Mar. 15, 2013

(65) Prior Publication Data
US 2014/0218392 A1    Aug. 7, 2014

Related U.S. Application Data

(60) Provisional application No. 61/760,026, filed on Feb. 1, 2013.

(51) Int. Cl.
| | |
|---|---|
| *G08G 1/123* | (2006.01) |
| *G06F 3/048* | (2013.01) |
| *G01C 21/36* | (2006.01) |
| *G09B 29/10* | (2006.01) |

(52) U.S. Cl.
CPC .......... *G01C 21/3667* (2013.01); *G09B 29/106* (2013.01)

(58) Field of Classification Search
USPC .......................................... 701/538; 715/792
See application file for complete search history.

(56) References Cited

U.S. PATENT DOCUMENTS

| | | | |
|---|---|---|---|
| 4,914,605 A | 4/1990 | Loughmiller, Jr. et al. | |
| 6,321,158 B1 * | 11/2001 | DeLorme et al. ............. | 701/426 |
| 8,355,862 B2 | 1/2013 | Matas et al. | |
| 8,438,481 B2 | 5/2013 | Lau et al. | |
| 8,464,182 B2 * | 6/2013 | Blumenberg et al. ......... | 715/863 |
| 8,606,516 B2 | 12/2013 | Vertelney et al. | |
| 8,607,167 B2 * | 12/2013 | Matas et al. .................. | 715/863 |

(Continued)

FOREIGN PATENT DOCUMENTS

| | | |
|---|---|---|
| EP | 2672225 | 12/2013 |
| EP | 2672226 | 12/2013 |

(Continued)

OTHER PUBLICATIONS

Author Unknown, "Android 2.3.4 User's Guide", May 20, 2011, pp. 1-384, Google, Inc.

(Continued)

*Primary Examiner* — Thomas G Black
*Assistant Examiner* — Tyler Paige
(74) *Attorney, Agent, or Firm* — Adeli LLP

(57) ABSTRACT

A method of selectively displaying maps on a mobile device. The method sends a map application, which had been displaying a first map, to the background. The method then returns the map application to the foreground. The method then determines whether to redisplay the previous map or display a map surrounding the then current location of the device. The determination is based on various factors including user interaction, time that the map application has been in the background and distance traveled while the map application is in the background.

20 Claims, 11 Drawing Sheets

(56) References Cited

U.S. PATENT DOCUMENTS

| | | | |
|---|---|---|---|
| 8,639,654 B2 | 1/2014 | Vervaet et al. | |
| 8,832,593 B2* | 9/2014 | Yates et al. | 715/790 |
| 2009/0171558 A1* | 7/2009 | Davis et al. | 701/200 |
| 2010/0302236 A1* | 12/2010 | Kinnan et al. | 345/419 |
| 2012/0254804 A1* | 10/2012 | Sheha et al. | 715/834 |
| 2013/0238241 A1* | 9/2013 | Chelotti et al. | 701/533 |
| 2013/0322665 A1* | 12/2013 | Bennett et al. | 381/300 |
| 2013/0332113 A1* | 12/2013 | Piemonte et al. | 702/189 |
| 2014/0013271 A1* | 1/2014 | Moore et al. | 715/792 |

FOREIGN PATENT DOCUMENTS

| | | |
|---|---|---|
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |

OTHER PUBLICATIONS

Author Unknown, "Garmin. nüvi 1100/1200/1300/1400 series owner's manual," Jan. 2011, 72 pages, Garmin Corporation, No. 68. Jangshu $2^{nd}$ Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 page, available at http://www.youtube.com/watch?v=v2aRkLkLT3s.

* cited by examiner

INTELLIGENT ADJUSTMENT OF MAP VIEWPORTS AT LAUNCH

BACKGROUND

In some presently existing applications that run on devices (e.g., on mobile devices), a user can leave an application running in the background (or close it) and come back to it later. Some applications maintain the state that they were in when the user moved them to the background (or closed them). For such applications, returning the application to the foreground (or reopening it) causes the application to re-display whatever it had previously been displaying. Other applications update the information on which their displays are based while running in the background or shortly after returning to the foreground (or being reopened). Some such applications display the updated information when the user returns them to the foreground or turns them back on.

BRIEF SUMMARY

In the present invention, an application on a device determines selectively whether to return to its previous state or to update its displayed information based on various different factors. In some embodiments, the application (e.g., a mapping and/or navigation application) determines whether to continue displaying the previous state (such a display of a previous state is sometimes called "displaying a previous viewport") by providing a user with a window of opportunity to interact with a display of the previous viewport before automatically displaying a new viewport. If the user chooses not to interact with the display of the previous viewport, then the display may switch to a new viewport.

The application of some embodiments may use one or more of several different factors to determine whether to switch to a new viewport. For example, some embodiments provide a setting that allows a user to determine whether the application automatically switches to a new viewport or selectively determines whether to switch to displaying a new viewport. In some embodiments, the application determines whether to switch to displaying a new viewport based on the amount of time that has passed since the application was last running in the foreground of the device.

In addition, or alternatively, the application of some embodiments determines whether to switch to a new viewport based on a distance from the current location of the device to the previous location of the device when the application was displaying the previous viewport. In some embodiments, this distance between the previous and current device locations only determines whether the application displays a new viewport or the previous viewport in specific circumstances. For example, when the previous viewport of the application was based on the location of the device when displaying the previous viewport, then the device having moved a significant distance from that location results in the application displaying a new viewport. In contrast, when the previous viewport of the application was based on a location distant from the location of the device when displaying the previous viewport, then the application displays the previous viewport upon activation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples discussed. It will be clear to one of ordinary skill in the art that various controls depicted in the figures are examples of controls provided for reasons of clarity. Other embodiments may use other controls while remaining within the scope of the present embodiment. For example, a control depicted herein as a hardware control may be provided as a software icon control in some embodiments, or vice versa. Similarly, the embodiments are not limited to the various indicators depicted in the figures. For example, in other embodiments, the location identifiers are provided by other shapes or combinations of shapes, the locations of interest are shown by other shapes than pins, etc.

Several of the figures described below show multiple stages of the same embodiments as each other. The figures of a particular set may be identical to each other in the earlier stages and differ in the later stages based on various different external factors. Differing actions of a user in the different figures determine what happens in the later stages of FIGS. 1 and 2. Different passages of time between corresponding stages of FIGS. 3 and 4 determine what happens in the later stages of those figures. A different change of location in the corresponding stages of FIGS. 5 and 6 determines differences in the final stages of those figures. Different starting conditions from the starting conditions of FIGS. 5 and 6 determine what happen in the later stages of FIG. 7.

Although the figures below all depict a mapping application, the features described herein could be applied to a combined mapping and navigation application or to any application where location influences or determines what the application will display (e.g., a search engine, a movie finding application, etc.).

I. User Interaction with Application after Reactivation

Figure 1:
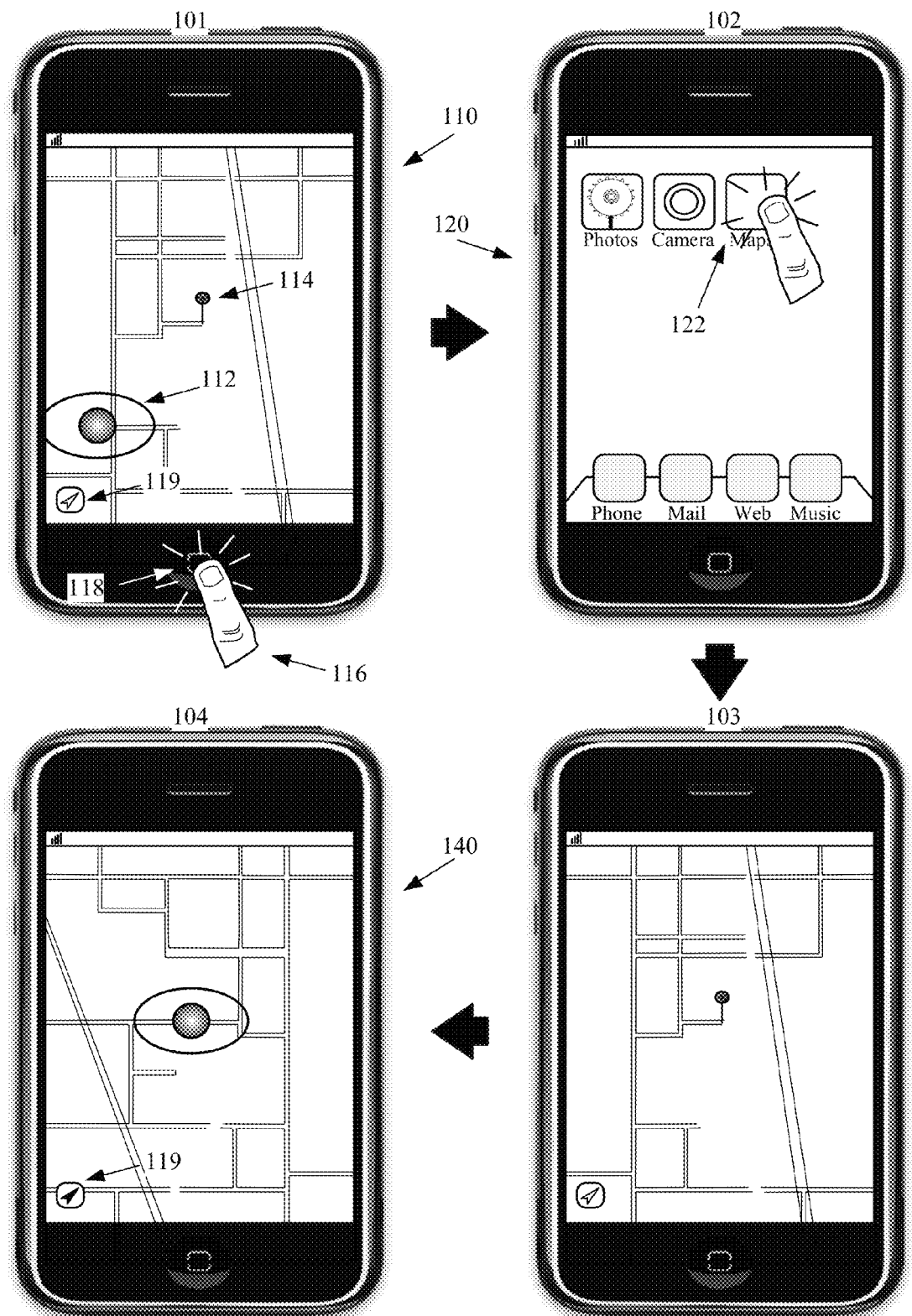
FIG. 1 illustrates an application changing viewports when the user does not interact with the application during the window of opportunity to prevent the application from changing viewports.
Figure 2:
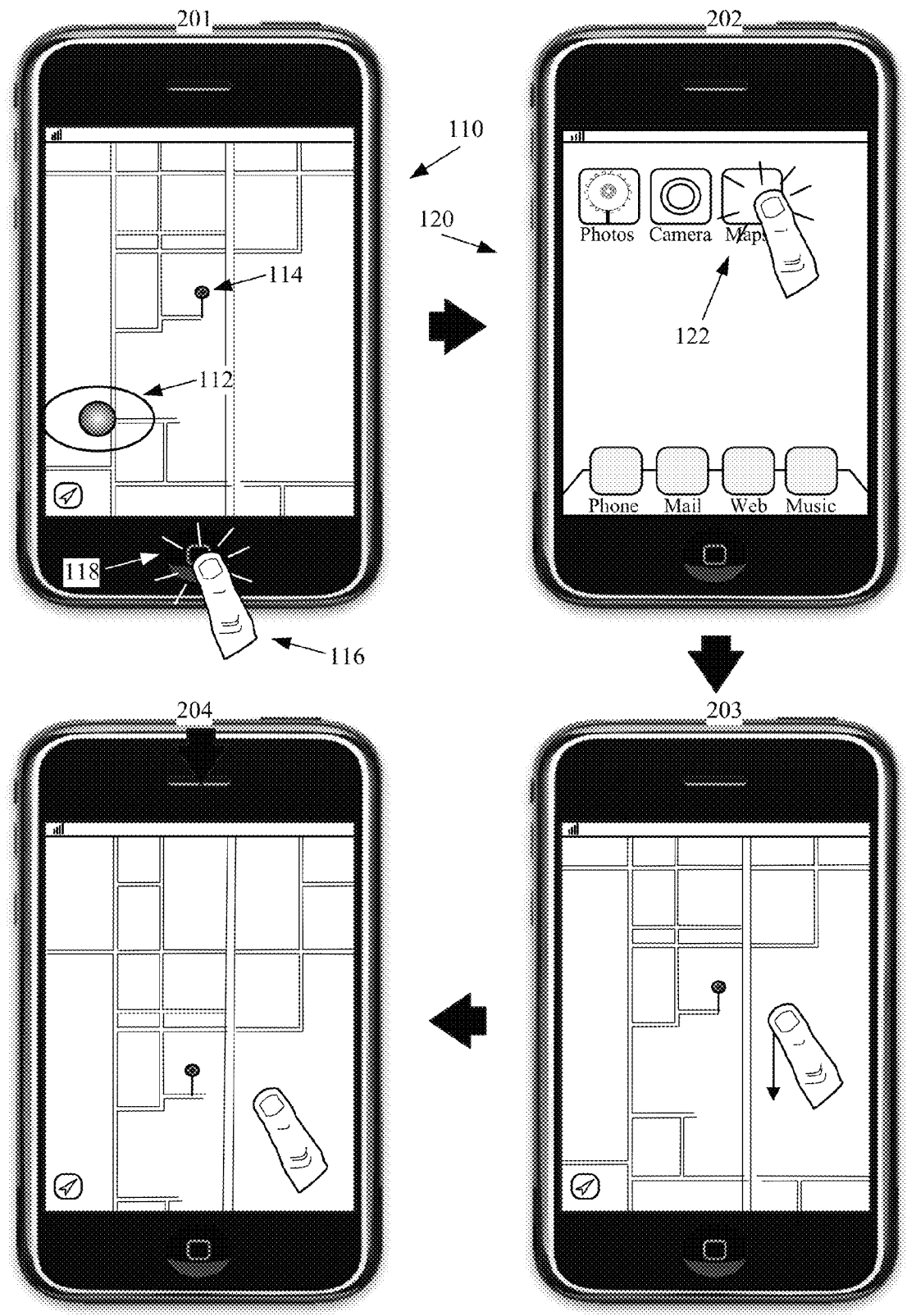
FIG. 2 illustrates a user's interaction with an application during a window of opportunity to prevent the application from changing viewports.

FIGS. 1 and 2 together illustrate an example of selectively displaying a new viewport or a previous viewport of a map application based on user interaction within a window of opportunity. FIG. 1 illustrates an application of some embodiments when the user does not interact with the application during the window of opportunity to prevent the application from changing viewports. FIG. 2 illustrates the application of those embodiments when the user interacts with an application during a window of opportunity to prevent the application from changing viewports.

FIG. 1 shows four stages 101-104 of a mobile device. The first two stages of FIG. 1 are identical to the first two stages of FIG. 2. In stage 101, the map application displays a particular map 110 in the foreground. The map includes a location identifier 112 (also referred to as a position indicator) and a point of interest pin 114. The point of interest pin 114 shows a particular location on the map other than the location of the device. For example, the point of interest pin could show the location of a store, restaurant, landmark, or other point of interest. The device may determine its location in order to display position indicator 112 based on GPS triangulation or triangulation of cell phone towers or by some other process. Also in stage 101, the user's finger 116 activates a control 118 that sends the map application into the background in some embodiments. In other embodiments, activating the control 118 turns the application off. One of ordinary skill in the art will understand that in different embodiments, different controls, both hardware and software controls (e.g., an icon on a touch screen) can be used to send the application to the background and/or to turn it off. One of ordinary skill in the art will understand that in other embodiments, the map application may be sent to the background (or turned off) by many different events or actions. For example, in some embodiments, the map application is running on a smart phone when a call comes in and the map application is automatically shunted to the background. For clarity, from this point on, the term "deactivate" will be applied to the action of a control or event that either turns off an application or sends it to the background. Similarly, the term "reactivate" will be applied to the action of a control or event that either turns on the application after having the application has been turned off or brings the application to the foreground from the background.

Stages 101, 103, and 104 include a tracking control 119 that is set to "tracking off" in stages 101 and 103 and set to "tracking on" in stage 104. In the illustrated embodiments, a tracking control set to "tracking on" has a filled in black center, while a tracking control set to "tracking off" has a white center. One of ordinary skill in the art will understand that other embodiments use other indications to display the status of the tracking setting determined by tracking control 119. For example, some embodiments use different symbols for tracking control 119, use different colors or patterns (e.g., an arrow, a button, etc.) to indicate whether the tracking is on or off, use other GUI controls (e.g., sliders instead of icons activated by tapping), use hardware buttons or other hardware controls, etc.

In some embodiments, when the tracking control 119 is set to "tracking on" at the time the user or the device deactivates the map application, the map application will automatically bring up a display of the current location when the map application reactivates. In some embodiments, when the tracking control is set to "tracking off", the map application uses various heuristics to determine whether the map application should display the previous map or a new map (e.g., a map of the area around the current location). In the embodiments illustrated in FIGS. 1-7, the tracking setting is initially set to "tracking off". In FIGS. 1, 4, and 6, the tracking setting is automatically turned to "on" when the heuristics determine that the map application should display a new map of the area around the current location. However, one of ordinary skill in the art will understand that in other embodiments, the tracking control 119 will not necessarily be visible at all times that the map application is displaying a map. Similarly, one of ordinary skill in the art will understand that in some embodiments, when the map application displays a new map of the area of the current location, the tracking control 119 will not be turned on automatically. That is, in such embodiments, the map of the current area will be displayed, but the map application will not subsequently automatically center the map on the current location unless the user manually turns on the tracking control 119 or the tracking control 119 is turned on automatically for some reason other than the heuristics described herein.

In stage 102, the device is displaying an application selection page 120 (e.g., home screen, desktop). In this stage, the map application has been deactivated. In stage 102, the user selects map application icon 122 to reactivate the map application. That is, in stage 102, the user's finger 116 taps the map application icon 122 to reactivate the map application. While this figure (and subsequent figures) illustrate user interaction with a touch screen, one of ordinary skill in the art will recognize that in other embodiments these user actions could be performed through other input devices (e.g., selection with a cursor controller, keyboard input, or other devices).

Although the transition shown in FIG. 1 is directly from stage 101 (in which the application is deactivated) to stage 102 in which the map application is reactivated, one of ordinary skill in the art will understand that in some embodiments, an indeterminate amount of time may pass between the time that the map application is deactivated and the time the map application is reactivated. During that time, various events could occur. For example, the user could use other applications of the device or the device itself could move any particular distance, including moving a distance so great that its new location is not on the map 110. One of ordinary skill in the art will understand that in various embodiments, there are various ways of reactivating the map application.

In stage 103, the device reactivates the map application. In this stage 103, the map application displays the same map 110 as in stage 101. The map 110 still includes the pin 114, in the same place relative to the screen, but no longer includes location identifier 112. The lack of location identifier 112 in the illustrated embodiment is because the map application has not determined the device's then current position in stage 103.

In FIG. 1, the user chooses not to interact with the application until a window of opportunity closes (i.e., the opportunity to interact with the previous map is lost). In some embodiments, the window of opportunity ends when the map application determines the location of the device (e.g., using a GPS receiver or other location identification mechanism). If the map application determines the location of the device before the user interacts with the map application, then in some embodiments, the window of opportunity closes and the application switches to a new viewport as shown in stage 104. In the applications of other embodiments, the window of opportunity stays open until a pre-set or a predetermined amount of time passes. In the application of some other embodiments, both conditions must be met for the window of opportunity to close. That is, in such embodiments, the window of opportunity closes when the latter of two events take place: (1) the device determines its location and (2) the pre-set time passes.

Once the window of opportunity for interaction closes, the map application then switches automatically from the map 110 to a map of its new location, map 140 in stage 104. Stage 104 shows the map application displaying the new map 140, with the location identifier 112 in the center of the map 140 to indicate that the map 140 is centered on the then current location. The application does not display pin 114 because the pin's 114 location is not visible on map 140. In some embodiments, if the location of the pin 114 was visible on the map surrounding the new location of the device then the application would display the pin 114 on the new map.

FIG. 2 is also divided into four stages 201-204. Stage 201 is identical to stage 101 and stage 202 is identical to stage 102. In stage 201, the device displays map 110 with location identifier 112 and pin 114. Also in stage 201, the user's finger 116 touches a control 118 that deactivates the map application (or turns it off).

In stage 202, the device is displaying an application selection page 120. In this stage, the map application has been deactivated. In stage 202, the user selects map application icon 122 to reactivate the map application. Although the transition in FIG. 2 is from stage 201 (in which the application is deactivated) directly to stage 202 in which the map application is reactivated, one of ordinary skill in the art will understand that in some embodiments, an indeterminate amount of time may pass between the time that the map application is deactivated and the time the map application is reactivated.

In the illustrated embodiment, the map application reactivates in stage 203. In the illustrated embodiment, the map application, upon reactivating, displays the same map 110 as it previously displayed. In some embodiments, the map application does not display the location identifier 112 if the map application has not yet determined the current location of the device. In other embodiments (not shown), the map application displays the location identifier 112 in its previous position at least until it determines the current location of the device. In FIG. 2, the user chooses to interact with the device before the window of opportunity closes. This is shown by the user's finger 116 touching the map 110 during stage 203. In some embodiments, the window of opportunity is whatever time is necessary to determine the current location of the device. In other embodiments, the window of opportunity is a pre-set threshold amount of time. In some embodiments, the device displays the previous map until the latter of (1) determining the current location of the device and (2) the pre-set time running out.

In some embodiments, the user's interaction with the map application while the previous map data was being displayed commands the map application to maintain the current display (or modify the display in accord with the user's interaction with the display). This is illustrated in stage 204 in which the user has dragged a finger 116 downward on the map. The change in the map display is that the map 110 has moved down with the user's finger 116. In stage 204, the map 140 around the current location is not displayed because the user's interaction with the old map preempts the switch to the new map.

II. Displaying a New Map Based on Deactivation Duration

Figure 3:
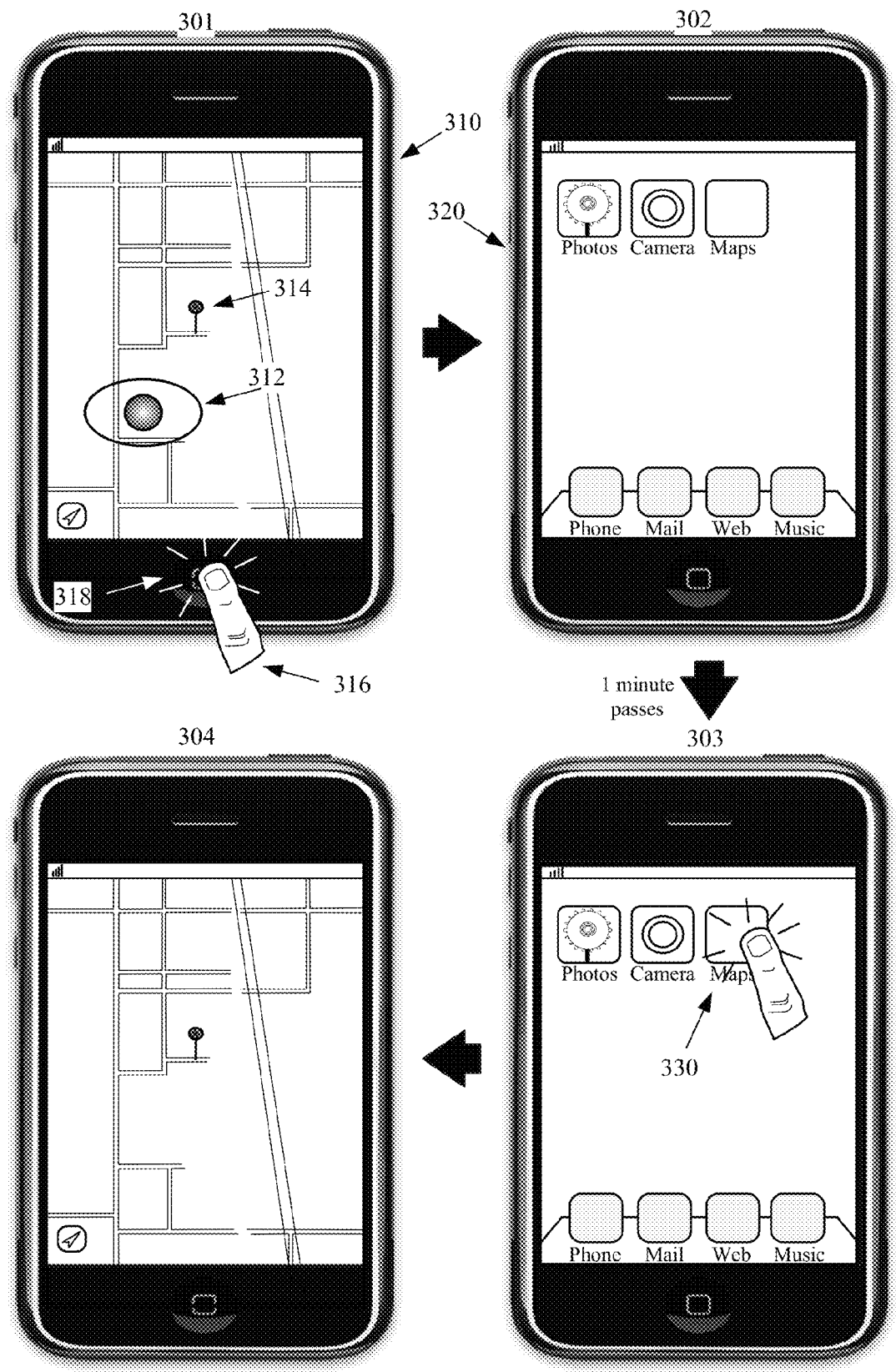
FIG. 3 illustrates a map application where a user reopens the map application within a pre-set amount of time.
Figure 4:
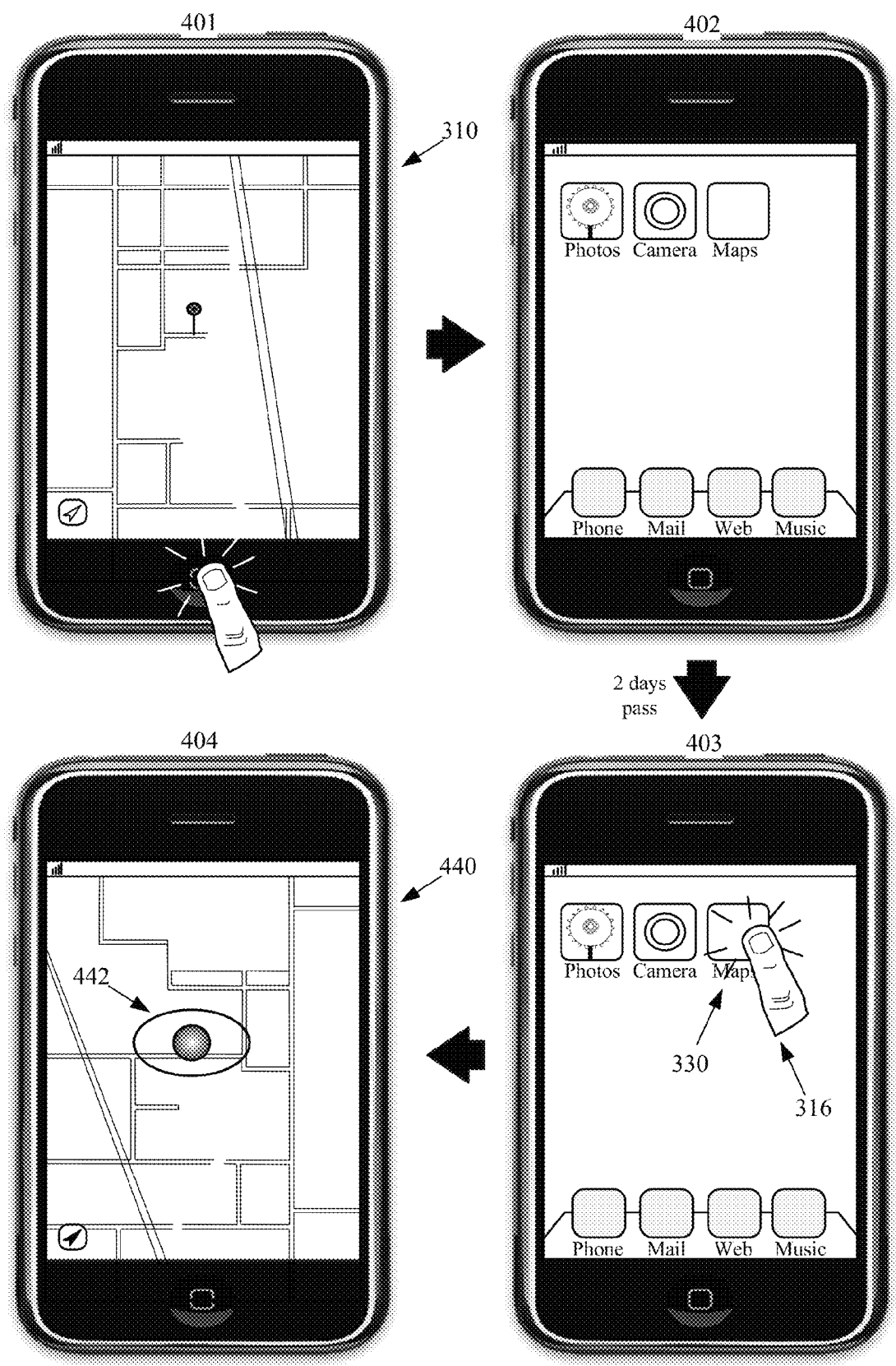
FIG. 4 illustrates a map application when a user reopens the map application after the pre-set amount of time.

FIGS. 3 and 4 together illustrate an example of selectively displaying a new viewport or old viewport of a map application based on passage of time between the closing of a map display and the opening of the map display. In the embodiment illustrated in FIGS. 3 and 4, if the map application is deactivated, then re-activated within a pre-set amount of time, the previous viewport is shown. If the pre-set amount of time has passed, then a new viewport, with the current location, is shown. FIG. 3 illustrates the embodiments when the user re-activates a map application within a pre-set amount of time. FIG. 4 illustrates the embodiments when the user reopens the map application after the pre-set amount of time has passed.

FIG. 3 shows four stages 301-304 of the device. In stage 301, the map application displays a map 310 of an area that includes the location of the device. In the map 310, there is a location identifier 312 identifying the location of the device and a pin 314 identifying the location of an item of interest (e.g., a store). In various embodiments, the map application determines the device's location based on GPS triangulation or triangulation of cell phone towers or by some other process. Also in stage 301, the user's finger 316 touches a control 318 that deactivates the map application and activates application selection page 320. One of ordinary skill in the art will understand that in some embodiments, the map application may be deactivated by many different events or actions including selection of the control 318.

In stage 302, the device displays an application selection page 320. In this stage, the map application is deactivated. In the illustrated embodiment, the user pushing the control 318 causes the device to display the application selection page 320. The device then either stays on the application selection page 320 for one minute (which is less than a threshold amount of time), or performs other operations for one minute and then returns to the application selection page 320. The user selects map application icon 330 to reactivate the map application. One of ordinary skill in the art will understand that in various embodiments, there are various ways (including, but not limited to, touching the map application icon 330) of reactivating the map application.

In stage 303, the user selects map application icon 330 to reactivate the map application. In the embodiments illustrated in FIG. 3, one minute has passed between deactivation of the map application and the subsequent reactivation of the map application. One of ordinary skill in the art will understand that in some embodiments, other applications may be used and/or other screen views may be presented on the display during the one minute between the map application being deactivated and the map application being reactivated.

In the illustrated embodiment, one minute is less than the pre-set, threshold amount of time for determining whether to show a new or old viewport (i.e., show a new map or the previous map 310). Accordingly, in the illustrated embodiment, the map application has been deactivated for less than a pre-set, threshold amount of time (e.g., the pre-set, threshold amount of time may be 12 hours and the map application has been deactivated for one minute). However, in some embodiments, the pre-set, threshold amount of time may be set to other times such as 5 minutes, 1 hour, 1 day, etc.

After the user reactivates the map application in stage 303, the map application reactivates in stage 304. In the illustrated embodiment, the map application, upon reactivation, displays the same map 310 as it previously displayed, because the application has been off for less than the threshold amount of time. In the illustrated case, the application does not show a location identifier on the map in stage 304. However, in some embodiments, a location identifier would be shown on the map in stage 304. In some embodiments, the location identifier 312 would be shown at its previous location (in stage 301) until the map application determined a new location. In some embodiments, the location identifier would be shown in an updated location (i.e., the then current location of the device) if the device was still within the area shown in map 310.

FIG. 3 illustrated the application of some embodiments under conditions where the map application remains deactivated for less than a pre-set amount of time. FIG. 4 illustrates the same embodiment in which the map application is deactivated for more than the pre-set amount of time. FIG. 4 is divided into four stages 401-404. The first three stages of FIG. 4, stages 401-402, are identical to the corresponding stages in FIG. 3. Stage 403 is visually identical to stage 303 of FIG. 3. However, in stage 403 a larger amount of time has passed between the time that the map application was deactivated and the time the map application is reactivated. By the time the user's finger 316 commands the device to reactivate the map application (by touching icon 330) in stage 403, more than the threshold time has passed (e.g., the threshold time is one day and the map application hasn't been reactivated for two days). Because enough time has passed, the data in the previous viewport (map 310) would probably no longer be relevant to the user. Accordingly, in stage 403, the map application displays a map 440 around the new location, shown by location identifier 442.

III. Displaying a New Map Based on Distance Traveled

A. Local Maps

Figure 5:
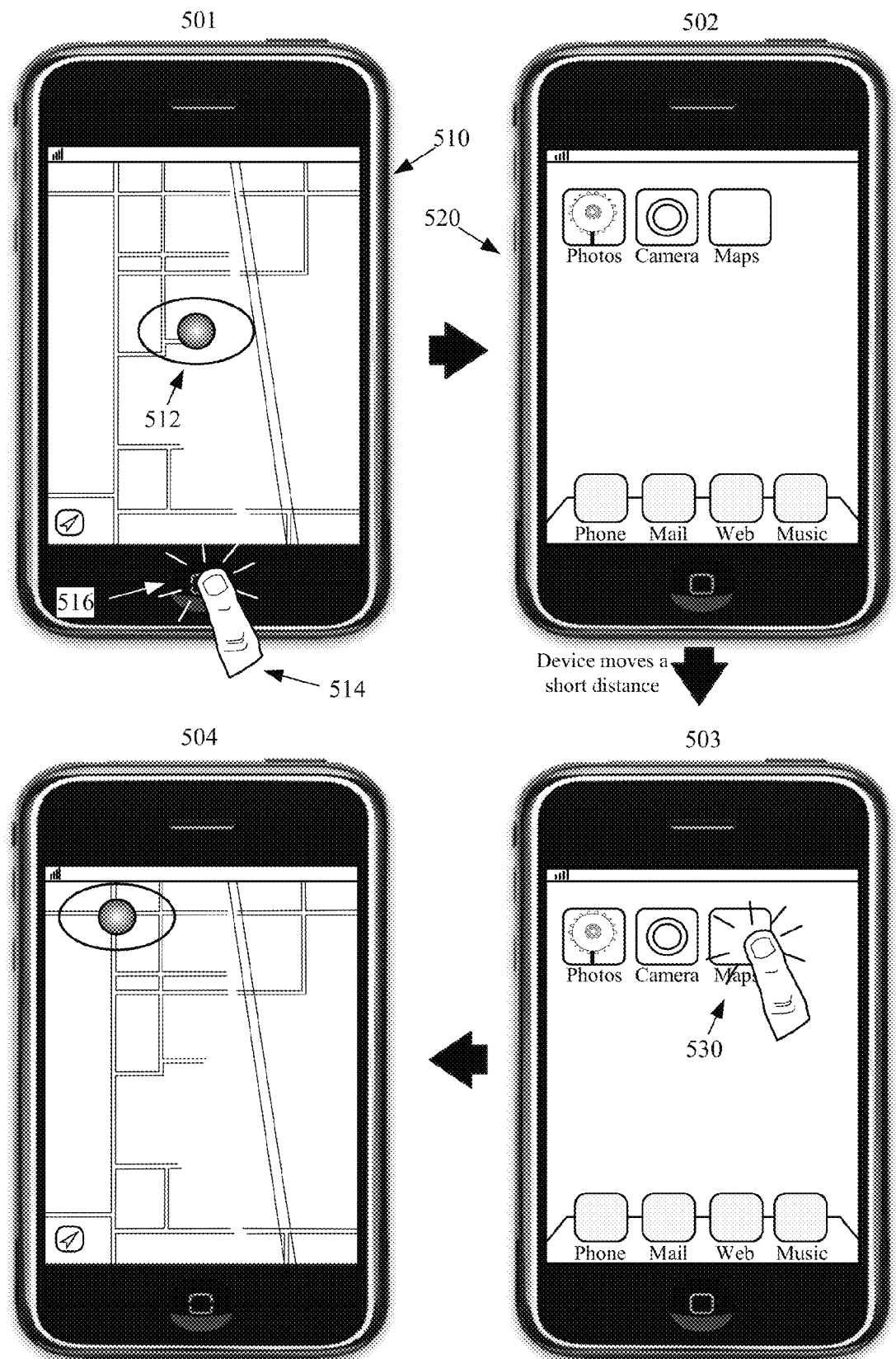
FIG. 5 illustrates the embodiments when the user reopens a map application after traveling a short distance.
Figure 6:
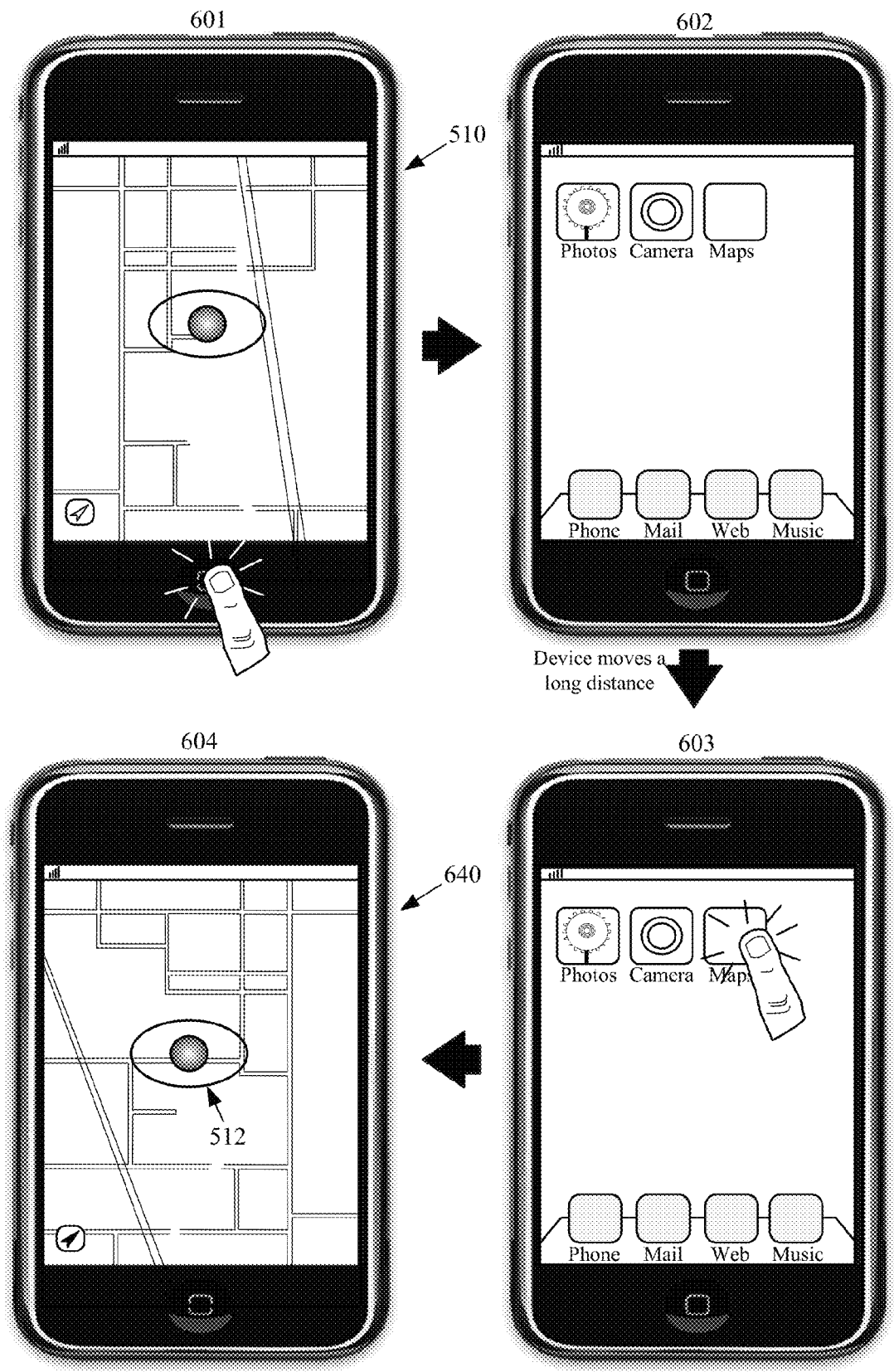
FIG. 6 illustrates the embodiments when the user reopens the map application after traveling a long distance.

FIGS. 5 and 6 together illustrate an example of selectively displaying a new viewport or old viewport of a map application based on distance traveled between deactivating a map application and reactivating the map application. FIG. 5 illustrates the embodiments when the user reactivates a map application after traveling a short distance. FIG. 6 illustrates the embodiments when the user reactivates the map application after traveling a long distance.

FIG. 5 shows into four stages 501-504 of the device. In stage 501, the device displays a map 510 of the area surrounding the device. In the map 510, there is a location identifier 512 identifying the location of the device relative to the map 510. The device may determine its location based on GPS triangulation or triangulation of cell phone towers or by some other process. Also in stage 501, the user's finger 514 touches a control 516 that deactivates the map application and brings to the foreground the application selection page 520. One of ordinary skill in the art will understand that in other embodiments, the map application may be deactivated by many different events or actions.

In stage 502, the device is displaying an application selection page 520. In this stage the map application has been deactivated. In stage 503, the device again displays the application selection page 520. However, the device may display other applications or otherwise leave the application selection page 520 between stages 502 and 503.

In stage 503, the user selects map application icon 530 to reactivate the map application. In the illustrated embodiment, the map application has been deactivated for a time during which the device has traveled only a short distance. In some embodiments, traveling a short distance means that the device has traveled somewhere within the confines of map 510. In other embodiments traveling a short distance means that the device has traveled either to a location that is on the map or to a location that is not on the map, but is within a wider area around the map 510 that the device has already loaded into memory (e.g., to display the wider area more quickly if the user decides to move the map 510). In some embodiments the map application pre-loads map tiles into memory and the distance is considered short if it is within the map tile or tiles loaded into memory at the time the map application was deactivated. In some embodiments, traveling a short distance means traveling within a threshold distance (e.g., 2 miles).

In stage 504, the map application displays the map 510, and displays location identifier 512 in a new location corresponding to the current location of the device. In the illustrated embodiment, the map 510 retains its previous position and the position indicator 512 is moved to a new location. In some embodiments, the map application will display the location identifier 512 without moving the map if the device has moved within the map 510, and display a new map surrounding the location identifier 512 if the device has moved outside the map (which is shown in FIG. 6).

FIG. 5 illustrated the application of some embodiments under conditions where the map application is deactivated while the device is moved a short distance. FIG. 6 illustrates the same embodiment in which the map application is deactivated while the device is moved a long distance. FIG. 6 shows four stages 601-604 of the device.

The first two stages of FIG. 6, stages 601 and 602, are identical to stages 501 and 502, respectively, of FIG. 5. Stage 603 is visually identical to stage 503 of FIG. 5; however, in stage 603, the device has traveled a long distance rather than a short distance as in stage 503 of FIG. 5. In some embodiments, traveling a long distance means that the device has traveled somewhere outside the confines of map 510. In other embodiments traveling a long distance means that the device has traveled to a location that is neither on the map 510 nor within a wider area around the map 510 that the device has already loaded into memory (e.g., to display the wider area more quickly if the user decides to move the map 510). In some embodiments, traveling a long distance means traveling beyond a threshold distance (e.g., 2 miles).

The device has passed beyond the boundaries of the map 510, the previous viewport. Therefore, the map 510 of the previous viewport is no longer as relevant as a map around the present location of the device would be. Accordingly, in stage 604, the map application displays a map 640 around the new location, shown by location identifier 512. One of ordinary skill in the art will understand that other embodiments display the location identifier 512 in a location other than the center of the new map 640.

B. Distant Maps

FIGS. 5 and 6 illustrate a rule of some embodiments that moving the device a short distance results in the map application displaying the old map upon reactivating the map application while moving the device a long distance results in the map application displaying a new map upon reactivating the map application. One justification for changing the viewport from an old map to a new map as shown in FIG. 6 is that the old map is no longer relevant. That justification assumes that the proximity of the old map to the device that made the old map relevant. In some embodiments, the user can command the map application to look at map locations that are distant from the device itself (e.g., a user in Los Angeles can look at a map of Paris). If the user is looking at a map that is distant from the device itself, then the relevance of that old map does not depend on proximity to the device. Accordingly, in some embodiments, the map application makes an exception to the rule shown in FIGS. 5 and 6.

In FIGS. 5 and 6, the original viewport showed map 510, a map of the current location as of stage 501/601. As mentioned above, when a user has been looking at a map of a distant location, the map of the distant location is relevant to the user for some reason that does not have to do with the map being a map of the local area of the user. Accordingly, in a map application of some embodiments that changes viewports when a device moves out of range of a displayed local map (as shown in FIG. 6), the map application does not change viewports if the device (1) is displaying a map beyond a threshold distance (e.g., 100 miles, 1000 kilometers, etc.) from the current location when the map application is deactivated and (2) the device moves a long distance between activations of the map application. This is contrary to the earlier described rule that moving a long distance will result in a change of maps.

Figure 7:
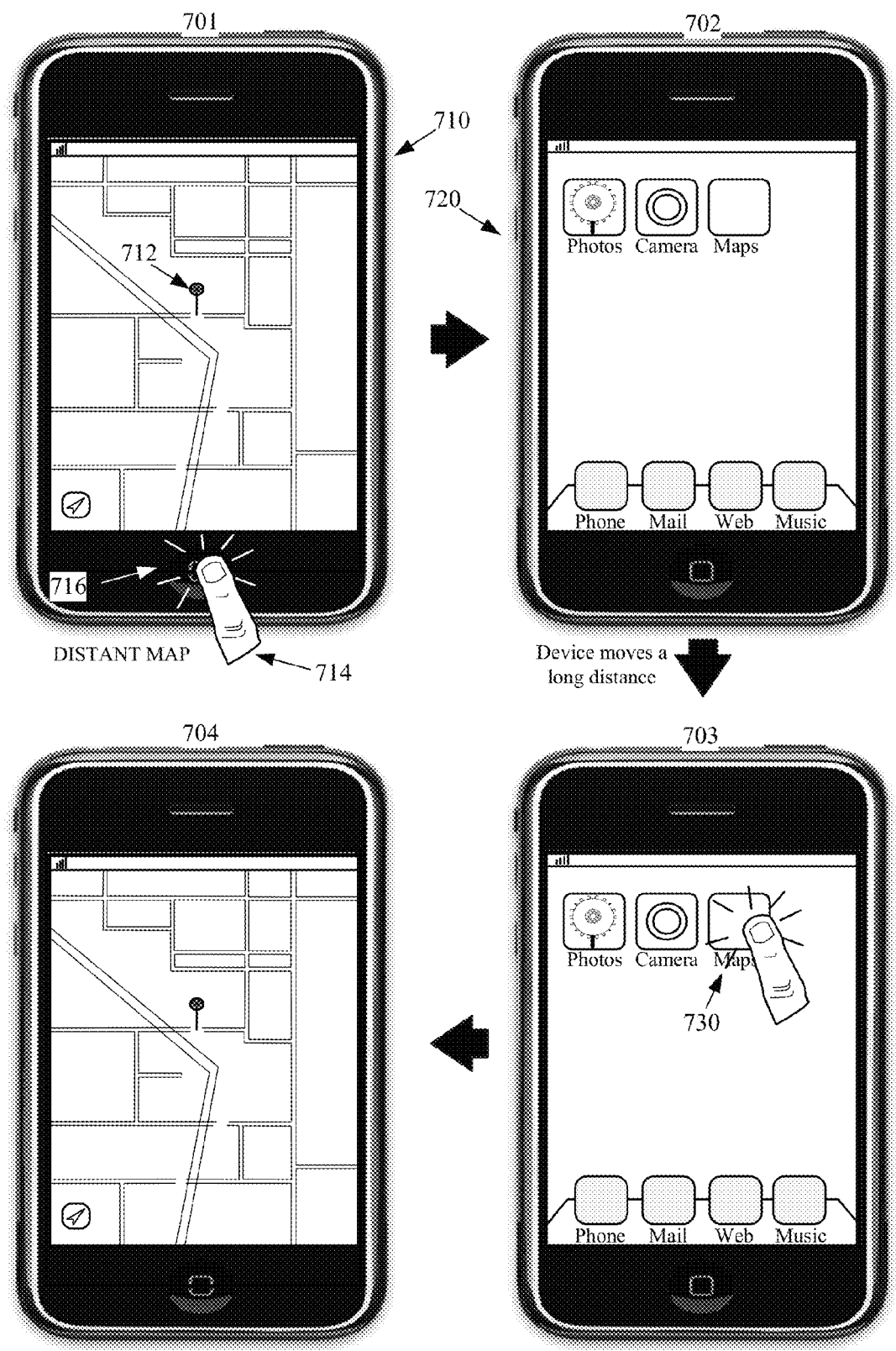
FIG. 7 illustrates the behavior of a map application that is viewing a distant location when it is deactivated and does not change to viewing a new location when it is reactivated.

FIG. 7 illustrates the behavior of a map application that is viewing a location beyond a threshold distance when it is deactivated and does not change to viewing a new location when it is reactivated. FIG. 7 shows four stages 701-704 of the device. In stage 701, a map application on a device is displaying a map 710. The map 710 is a map of a location that is beyond a threshold distance (e.g., 1000 km) from the current location of the device. The scale of the map does not show places 1000 km from the center of the map. Therefore, the map 710 does not have a location identifier to show the current location of the device. However, the map 710 does include a pin 712 that shows a location of interest (e.g., a museum). Also in stage 701, the user's finger 714 touches a control 716 that deactivates the map application and brings the application selection page 720 to the foreground. One of ordinary skill in the art will understand that in other embodiments, the map application may be deactivated by many different events or actions.

In stage 702, the device is displaying an application selection page 720. In this stage, the map application is deactivated. Between stages 702 and 703 the device moves a long distance (e.g., beyond the normal threshold distance for displaying a new map upon returning to the map application).

In stage 703, the user selects map application icon 730 to reactivate the map application. In the illustrated embodiment, the map application has been deactivated for a time during which the device has traveled a long distance. The map application is reactivated in stage 704. In the illustrated embodiment, the map application, upon reactivation, displays the same map 710 as it previously displayed. Since the previously displayed map 710 was not a map of the user's previously local area, the user must have had a reason other than looking at the local area to display map 710. Therefore, even though the device has traveled a long distance, the same reason may still apply when the map application is turned back on. Accordingly, the map application of some embodiments continues to display a map of the distant location, even though the device has moved a long distance. One of ordinary skill in the art will understand that the threshold distance (e.g., 2 miles) moved that activates the display of a new map is not necessarily the same as the threshold distance of a map from the present location to activate the rule illustrated in FIG. 7.

IV. Combined Heuristics

In the previously described FIGS. 1-7, the map application determined whether to display an old map or display a new map according to one rule or the other. In FIGS. 1 and 2, the application applied the rule that if the user interacted with the old map within a threshold time, the map application would continue to be display the old map, while if the user did not interact with the old map within a threshold time, the map application would display a new map around the then current location. In FIGS. 3 and 4, the application applied the rule that if the map application had been deactivated for less than a threshold time, the map application would display the old map, while if the map application had been deactivated for more than the threshold time, the map application would display a new map of the area around the then current location. In FIGS. 5 and 6, the application applied the rule that if the map application had been deactivated while the device traveled less than a threshold distance, the map application would display the old map, while if the map application had been deactivated while the device traveled more than the threshold distance, the map application would display a new map of the area around the then current location. FIG. 7 illustrated an exception to the rule illustrated in FIGS. 5 and 6. In FIG. 7, if the map application had been displaying a map of a distant location before the map application was deactivated, then the map application displayed the old map even if the device traveled a long distance while the map application was deactivated.

Figure 8:
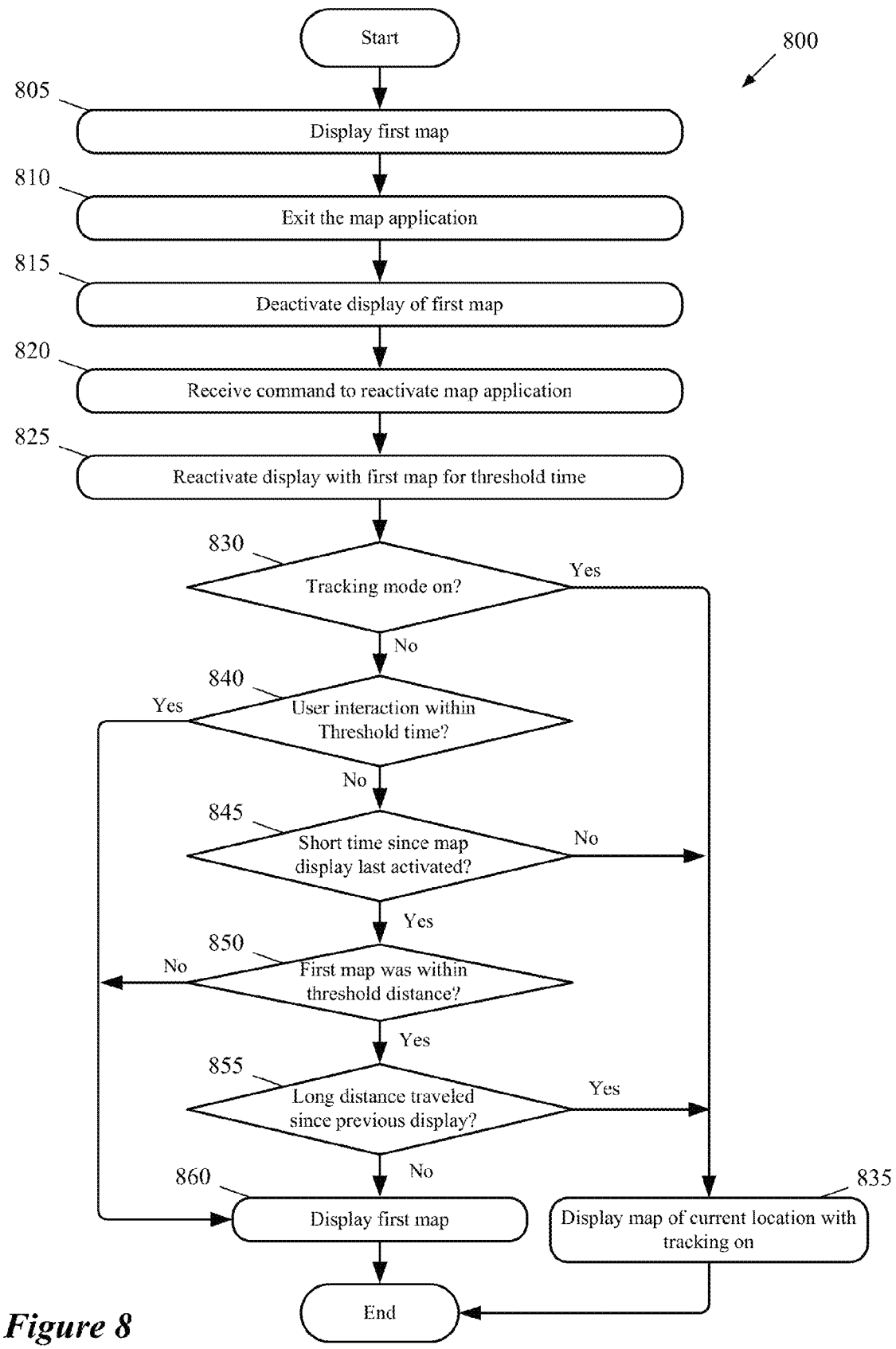
FIG. 8 conceptually illustrates a process of some embodiments for determining whether to display a previous map or a map of a current location.

FIG. 8 conceptually illustrates a process 800 of some embodiments for determining whether to continue to display a first map or display a new map. The process 800 combines all of the previous rules and provides a hierarchy for applying them. One of ordinary skill in the art will understand that other embodiments may use a different hierarchy of rules. One of ordinary skill in the art will also realize that some embodiments may use a subset of the rules, rather than using all of the described rules.

The process 800 begins by displaying (at 805) a first map. Displaying a map is a standard function of map applications. The process 800 then exits (at 810) the map application. In some embodiments the process leaves the map application because of a command to deactivate the map application or because of other conditions. A user or an application or function of the device on which the map application is running can provide such a command. In some embodiments, a machine other than the device the map application is running on receives the command to leave the map application. The machine that receives the command then sends a code to the device to cause the device to leave the maps application. For example, in some embodiments, the map application runs on a smart phone and will be automatically deactivated when the phone rings. In some embodiments, under some circumstances, the device may leave the map application without a command being received by any machine. For example, if power runs out, the device could shut down automatically as a result of running out of power. If power is then restored, the device could reactivate with the map application deactivated. While leaving the map application (or in some embodiments, before leaving the map application) the process 800 deactivates (at 815) the display of the first map.

Eventually, the device receives (at 820) a command to reactivate the map application. Either the user or some application or function of the device provides the command. For example, in some embodiments when the map application is running on a smart phone and the device deactivates the map application for a phone call, the device reactivates the map application automatically when the phone call ends. The process 800 then reactivates (at 825) the display of the first map for a threshold time. In some embodiments, the threshold time is not fixed, but is whatever amount of time is used by the map application to determine the current location of the device. In other embodiments, the threshold time is fixed (e.g., 30 seconds). In still other embodiments, the threshold time ends at the latter of the expiration of a fixed time and the amount of time necessary to determine the current location.

The process 800 then determines (at 830) whether the tracking mode is on (e.g., whether the tracking control 119 of FIG. 1 is set to "tracking on" or "tracking off"). If the tracking mode is on, then the map application displays (at 835) a new map of the current location, and the process 800 ends. In some embodiments, when the map application determines that conditions have been met that require showing a map of the area around the current location the map application automatically turns on tracking mode and displays the second map.

In some embodiments, the tracking mode is significant even earlier in the process 800. For example, in some embodiments, when a tracking mode is on, the process 800 displays (at 825) the first map only for as much time as the map application needs to determine the current location. However, when the tracking mode is off, the process 800 displays (at 825) the first map for the longer of a preset time and the time necessary to identify the current location.

If the process 800 determines (at 830) that the tracking mode is off, then the process 800 determines (at 840) whether the user has interacted with the map application within the threshold time during which the first map was displayed. If the user has interacted with the map application during the time in which the first map was displayed, then the process 800 continues to display (at 860) the first map, and the process ends.

If the user does not interact with the map application during the threshold time for such interaction, the process 800 determines (at 845) whether a short time (less than a threshold time) has passed since the map display was last reactivated. In some embodiments the threshold time for determining whether a short time has passed since the map application was last activated is not the same as the threshold time for interaction with the map application while the first map is redisplayed. If a long time has passed, then the process 800 displays (at 835) the second map, and the process ends.

If a short time has passed, then the process 800 determines (at 850) whether the first map was within a threshold distance (e.g., 1000 km) of the device when the first map was shut off. If the first map was not within the threshold distance (e.g., the map was a map of a location more than 1000 km from the device), then the process 800 continues to display (at 860) the first map, and the process ends.

If the first map was within the threshold distance (e.g., the map was of a location less than 1000 km from the device), then the process 800 determines (at 855) whether the device has traveled a long distance since the map application was previously displayed. If the device has traveled a long distance, then the process 800 displays (at 835) the second map and the process ends. If the device has traveled only a short distance (or has not moved) then the process 800 continues to display (at 860) the first map.

In some embodiments, the presence or absence of points of interest on the map affects the threshold times and/or the threshold distances. If there are points of interest (e.g., as shown by pins in the previous figures) present on the first map, the process of some embodiments adjusts the thresholds in a way that makes the first map more likely to display. For example, in some embodiments if the first map includes a point of interest, then the preset time for interacting with the map (during operation 825) may be greater than if the first map had no points of interest. In some embodiments, if the first map has a point of interest, the process may increase the threshold time since last activation (e.g., to 10 minutes) over the threshold time since last activation (e.g., 5 minutes) for a first map without points of interest. Similarly, in some embodiments, if the first map has a point of interest, the process may increase the threshold distance traveled since last activation (e.g., to 5 miles) over the threshold distance traveled since last activation (e.g., 2 miles) for a first map without points of interest. Finally, the threshold distance for identifying a map as a "distant" map to activate the exception to the rule about distance traveled may be less (e.g., 500 km) for a first map with a point of interest than for a map without a point of interest (e.g., 1000 km).

In some embodiments, the number of points of interest on the map also affects the threshold values, for example, the threshold for time since the map application was last activated may increase more if there are five points of interest than if there was only one. One of ordinary skill in the art will understand that the specific times and distances mentioned throughout are not limitations of the invention and that some embodiments use other threshold times and distances.

Although the previously described FIGS. 1-7 show embodiments in which actual maps are displayed, in some embodiments, applications which do not display actual maps are updated according to heuristics identical to or similar to the above described heuristics. That is, some embodiments update their display based on the current location, the amount of time that has passed since the application was activated, the distance the device on which the application is running travels while the application is deactivated, and/or the distance of the previous search location (e.g., the area being searched for movie theaters) from the location of the device when the application was last activated.

For example, an application for finding out what movies are playing at movie theaters near a particular location may use identical or similar heuristics. If this application is deactivated and reactivated, the application may give the user a limited time to interact with previous movie list before automatically updating the list to reflect the current location of the device. Similarly to the map applications of some embodiments, if this application is deactivated for a short time, the old list will be retained, while if the application is deactivated for a long time a new list will be displayed reflecting the local movies. The application may also display the old list if the device has moved a short distance and a new list if the device has moved a long distance. Similar to the map applications of some embodiments, if the user is browsing movies near a distant point (e.g., the other side of town) rather than the local movies, the application may return to that list even if the user has moved a long distance while the application was deactivated. Such a rule accommodates the case where a user is looking for a movie near a place he is going to later, rather than near his current location. The map applications displayed in the figures could be combined map and navigation features. The same or similar heuristics can be used in embodiments that provide combined map and navigation features, or search applications that use locations, etc.

V. Mobile Device

Figure 9:
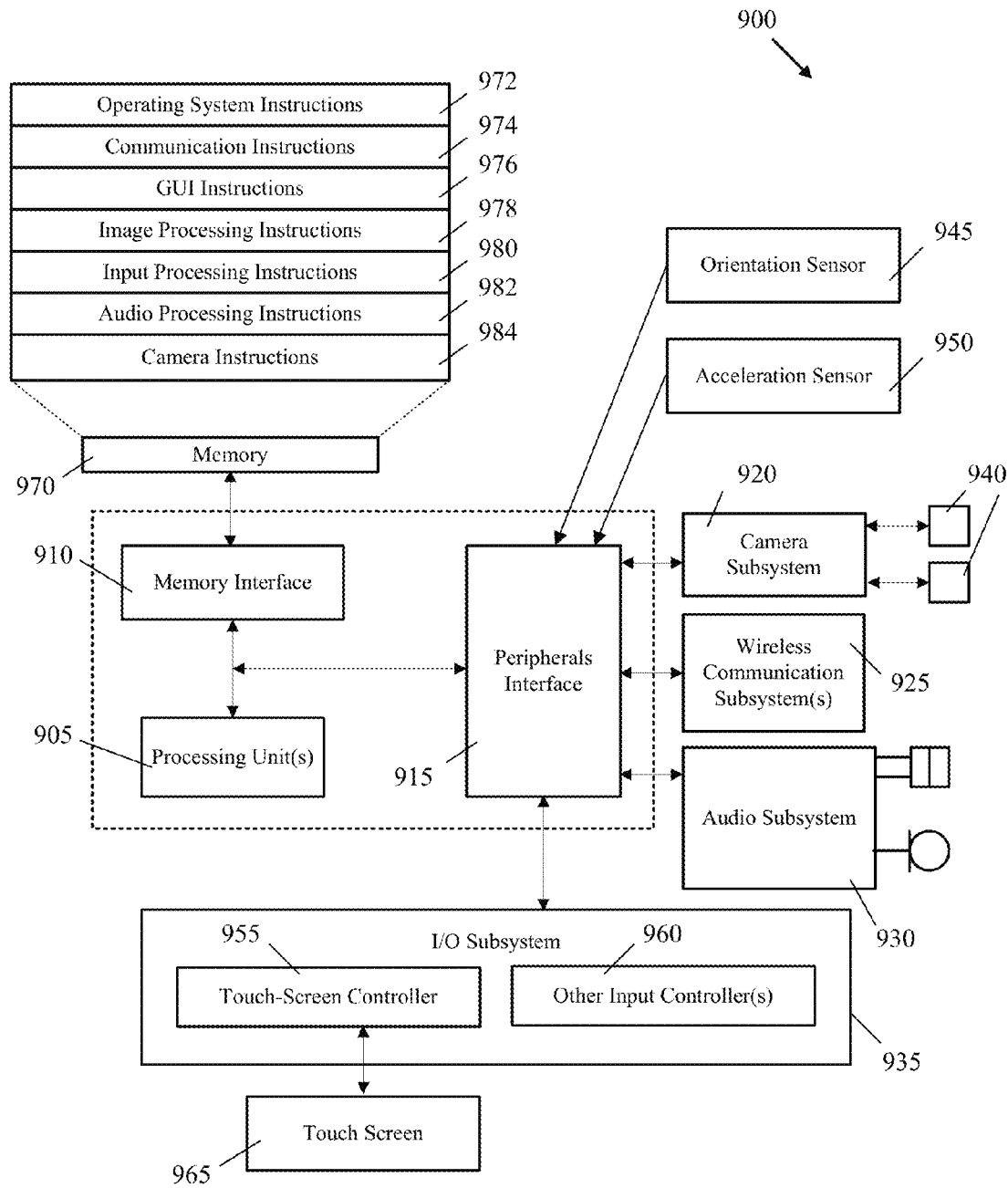
FIG. 9 illustrates an example of an architecture of a mobile computing device.

The map applications with selective display of previous maps and new maps of some embodiments operate on mobile devices, such as smartphones (e.g., iPhones®) and tablets (e.g., iPads®). FIG. 9 is an example of an architecture 900 of such a mobile computing device. Examples of mobile computing devices include smartphones, tablets, laptops, etc. As shown, the mobile computing device 900 includes one or more processing units 905, a memory interface 910 and a peripherals interface 915.

The peripherals interface 915 is coupled to various sensors and subsystems, including a camera subsystem 920, a wireless communication subsystem(s) 925, an audio subsystem 930, an I/O subsystem 935, etc. The peripherals interface 915 enables communication between the processing units 905 and various peripherals. For example, an orientation sensor 945

(e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wireless communication subsystem 925 serves to facilitate communication functions. In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions, such as voice recognition (e.g., for searching), digital recording, etc.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 972. The OS 972 includes instructions for handling basic system services and for performing hardware dependent tasks.

The memory 970 also includes communication instructions 974 to facilitate communicating with one or more additional devices; graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. Additionally, the memory may include instructions for a multi-mode mapping application. The above-identified instructions need not be implemented as separate software programs or modules. Various functions of the mobile computing device can be implemented in hardware and/or in software, including in one or more signal processing and/or application specific integrated circuits. The map application of some embodiments uses the memory 970 to store data about the previous maps while the map application is running in the background or is closed. When the map application of some embodiments is reactivated, the map application retrieves the previous maps from the memory 970.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

VI. Computer System

Figure 10:
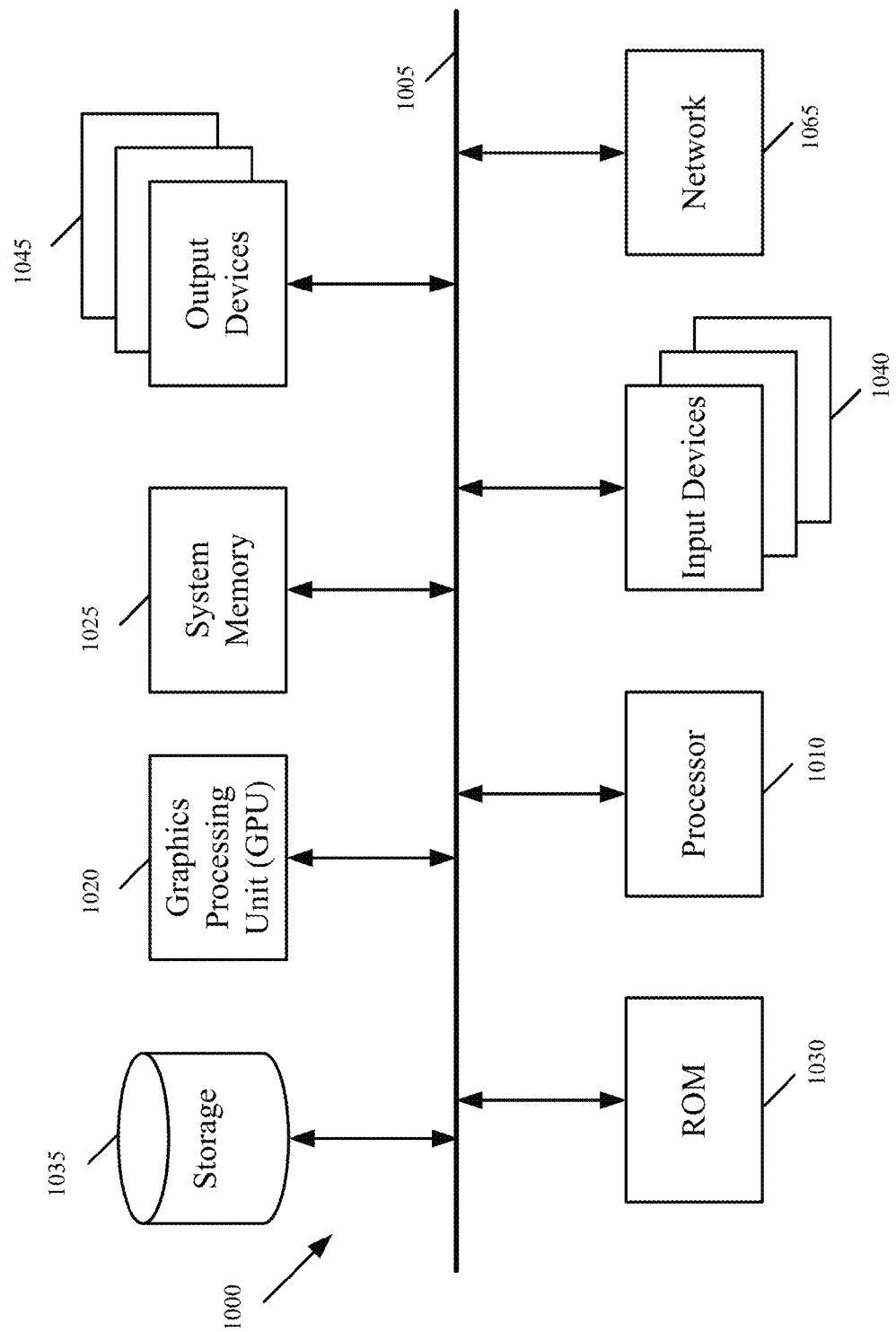
FIG. 10 conceptually illustrates another example of an electronic system with which some embodiments of the invention is implemented.

FIG. 10 conceptually illustrates another example of an electronic system 1000 with which some embodiments of the invention is implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VII. Map Service Environment

Figure 11:
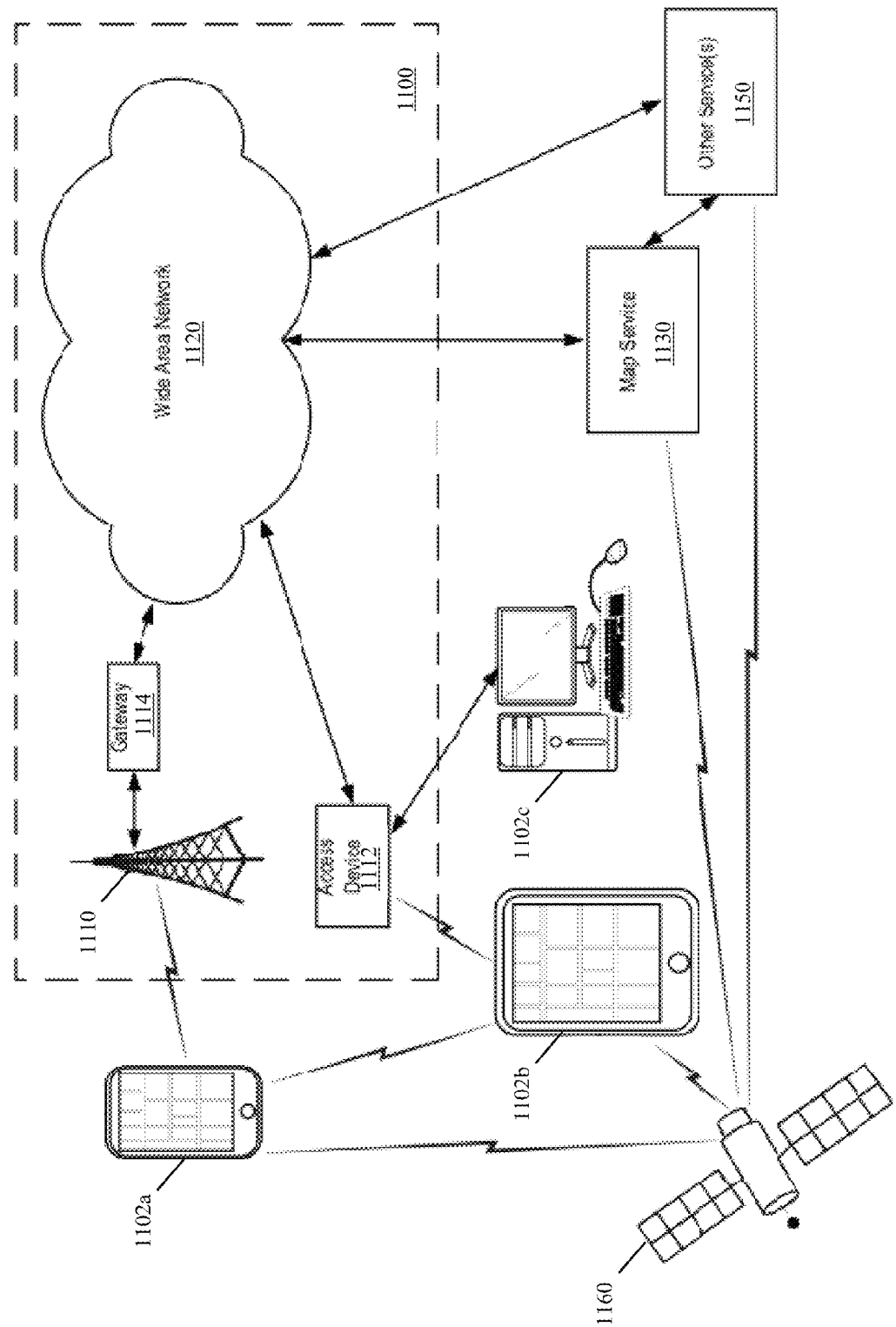
FIG. 11 illustrates a map service operating environment, according to some embodiments.

Various embodiments may operate within a map service operating environment. FIG. 11 illustrates a map service operating environment, according to some embodiments. A map service 1130 (also referred to as mapping service) may provide map services for one or more client devices 1102a-1102c in communication with the map service 1130 through various communication methods and protocols. A map service 1130 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1102a-1102c may utilize these map services by obtaining map service data. Client devices 1102a-1102c may implement various techniques to process map service data. Client devices 1102a-1102c may then provide map services to various entities, including, but not limited to, users, internal software or hardware modules, and/or other systems or devices external to the client devices 1102a-1102c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1102a-1102c) are implemented on different portable-multi-function device types. Client devices 1102a-1102c utilize map service 1130 through various communication methods and protocols. In some embodiments, client devices 1102a-1102c obtain map service data from map service 1130. Client devices 1102a-1102c request or receive map service data. Client devices 1102a-1102c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). As mentioned in previous sections, in some embodiments a GPS detection system is used in some embodiments to determine location after the map application is returned to the foreground or reopened. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 11 illustrates one possible embodiment of an operating environment 1100 for a map service 1130 and client devices 1102a-1102c. In some embodiments, devices 1102a, 1102b, and 1102c communicate over one or more wire or wireless networks 1110. For example, wireless network 1110, such as a cellular network, can communicate with a wide area network (WAN) 1120, such as the Internet, by use of gateway 1114. A gateway 1114 in some embodiments provides a packet oriented mobile data service, such as General Packet Radio Service (GPRS), or other mobile data service allowing wireless networks to transmit data to other networks, such as wide area network 1120. Likewise, access device 1112 (e.g., IEEE 802.11g wireless access device) provides communication access to WAN 1120. Devices 1102a and 1102b can be any portable electronic or computing device capable of communicating with a map service. Device 1102c can be any non-portable electronic or computing device capable of communicating with a map service.

In some embodiments, both voice and data communications are established over wireless network 1110 and access device 1112. For instance, device 1102a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1110, gateway 1114, and WAN 1120 (e.g., using Transmission Control Protocol/Internet Protocol (TCP/IP) or User Datagram Protocol (UDP)). Likewise, in some implementations, devices 1102b and 1102c can place and receive phone calls, send and receive e-mail messages, and retrieve electronic documents over access device 1112 and WAN 1120. In various embodiments, any of the illustrated client device may communicate with map service 1130 and/or other service(s) 1150 using a persistent connection established in accordance with one or more security protocols, such as the Secure Sockets Layer (SSL) protocol or the Transport Layer Security (TLS) protocol.

Devices 1102a and 1102b can also establish communications by other means. For example, wireless device 1102a can communicate with other wireless devices (e.g., other devices 1102b, cell phones, etc.) over the wireless network 1110. Likewise devices 1102a and 1102b can establish peer-to-peer communications 1140 (e.g., a personal area network) by use of one or more communication subsystems, such as Bluetooth® communication from Bluetooth Special Interest Group, Inc. of Kirkland, Wash. Device 1102c can also establish peer to peer communications with devices 1102a or 1102b (not shown). Other communication protocols and topologies can also be implemented. Devices 1102a and 1102b may also receive Global Positioning Satellite (GPS) signals from GPS satellites 1160.

Devices 1102a, 1102b, and 1102c can communicate with map service 1130 over the one or more wire and/or wireless networks, 1110 or 1112. For instance, map service 1130 can provide a map service data to rendering devices 1102a, 1102b, and 1102c. Map service 1130 may also communicate with other services 1150 to obtain data to implement map services. Map service 1130 and other services 1150 may also receive GPS signals from GPS satellites 1160.

In various embodiments, map service 1130 and/or other service(s) 1150 are configured to process search requests from any of client devices. Search requests may include but are not limited to queries for business, address, residential locations, points of interest, or some combination thereof. Map service 1130 and/or other service(s) 1150 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1130 and/or other service(s) 1150 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1130 and/or other service(s) 1150, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1130 and/or other service(s) 1150 provide one or more feedback mechanisms to receive feedback from client devices 1102a-1102c. For instance, client devices may provide feedback on search results to map service 1130 and/or other service(s) 1150 (e.g., feedback specifying ratings, reviews, temporary or permanent business closures, errors etc.); this feedback may be used to update information about points of interest in order to provide more accurate or more up-to-date search results in the future. In some embodiments, map service 1130 and/or other service(s) 1150 may provide testing information to the client device (e.g., an A/B test) to determine which search results are best. For instance, at random intervals, the client device may receive and present two search results to a user and allow the user to indicate the best result. The client device may report the test results to map service 1130 and/or other service(s) 1150 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method of displaying maps in a map application running on a mobile device, the method comprising:
    displaying a first map in the map application operating in a foreground mode;
    sending the map application to operate in a background mode;
    receiving a command to return the map application to operate in the foreground mode;
    returning the map application to the foreground and displaying the first map while identifying a current location of the mobile device; and
    based on an assessment of a set of conditions, selectively continuing to display the first map or displaying a second map that is associated with the current location of the device,
    wherein the set of conditions comprises a condition relating to whether interaction with the first map is received within a threshold amount of time after returning to the display of the first map,
    wherein the second map is displayed when interaction with the map is not received within the threshold amount of time, while the first map is continued to be displayed when interaction with the map is received within the threshold amount of time.

2. The method of claim 1, wherein the threshold amount of time is based on an amount of time required to identify the current location of the mobile device.

3. The method of claim 1, wherein a particular time passes between sending the map application to operate in the background and returning the map application to the foreground, wherein the set of conditions further comprises a condition relating to whether the particular time is less than a second threshold amount of time.

4. The method of claim 1, wherein the device travels a particular distance between sending the map application to operate in the background and returning the map application to the foreground, wherein the set of conditions further comprises a condition relating to whether the particular distance is less than a threshold distance.

5. The method of claim 1 further comprising determining a distance from a location of the device to a location represented by the first map, wherein the set of conditions further comprises a condition relating to whether the distance from the location of the device to the location represented by the first map is greater than a threshold distance.

6. The method of claim 1, wherein sending the map application to operate in the background comprises closing the application.

7. The method of claim 6, wherein returning to the map application comprises re-opening the map application.

8. A non-transitory computer readable media storing a set of programs which when executed on at least one processing unit displays maps in a map application, the set of programs comprising sets of instructions for:
displaying a first map in a display area of the map application operating in a foreground mode;
sending the map application to operate in a background mode;
receiving a command to return to the map application to operate in the foreground mode;
returning the map application to the foreground and displaying the first map in the display area while identifying a current location of the mobile device; and
based on an assessment of a set of conditions, selectively continuing to display the first map or displaying a second map that is associated with the current location of the device,
wherein the set of conditions comprises a condition relating to whether interaction with the first map is received within a threshold amount of time after returning to the display of the first map,
wherein the second map is displayed when interaction with the map is not received within the threshold amount of time, while the first map is continued to be displayed when interaction with the map is received within the threshold amount of time.

9. The non-transitory computer readable media of claim 8, wherein the threshold amount of time is based on an amount of time required to identify the current location of the mobile device.

10. The non-transitory computer readable media of claim 8, wherein a particular time passes between sending the map application to operate in a background mode and the returning the map application to the foreground, wherein the set of conditions further comprises a condition relating to whether the particular time is less than a second threshold amount of time.

11. The non-transitory computer readable media of claim 8, wherein the device travels a particular distance between sending the map application to operate in the background and the returning the map application to the foreground, wherein the set of conditions further comprises a condition relating to whether the particular distance is less than a threshold distance.

12. The non-transitory computer readable media of claim 8, wherein the set of programs further comprises a set of instructions for determining a distance from a location of the device to a location represented by the first map, wherein the set of conditions further comprises a condition relating to whether the distance from the location of the device to the location represented by the first map is greater than a threshold distance.

13. A method of displaying maps in a map application running on a mobile device, the method comprising:
returning a map application to the foreground after the map application was previously sent into the background while displaying a first map; and
based on an assessment of a set of conditions, selectively continuing to display the first map or displaying a second map that is associated with a current location of the device,
wherein the set of conditions comprises a condition relating to whether the current location is more than a threshold distance from a previous location at which the map application was previously in the foreground and was previously displaying the first map,
wherein the second map is displayed when the current location is more than the threshold distance, while the first map is continued to be displayed when the current location is less than a threshold distance.

14. The method of claim 13, wherein the set of conditions further comprises a condition relating to whether the map application has been running in the background for more than a threshold time before the returning of the map application to the foreground.

15. The method of claim 13, wherein the set of conditions further comprises whether the device has moved to a location that is not displayed on the first map while the map application was in the background.

16. The method of claim 13, wherein the set of conditions further comprises whether a location represented by the first map was less than a second threshold distance away from the mobile device when the map application was sent to the background.

17. A non-transitory computer readable media storing a set of programs which when executed on at least one processing unit displays maps in a map application, the set of programs comprising sets of instructions for:
reopening a map application after the map application was previously closed while displaying a first map; and
based on an assessment of a set of conditions, selectively continuing to display the first map or displaying a second map that is associated with a current location of the device,
wherein the set of conditions comprises a condition relating to whether the current location is more than a threshold distance from a previous location at which the map application was closed;
wherein the second map is displayed when the current location is more than the threshold distance, while the first map is continued to be displayed when the current location is less than a threshold distance.

18. The non-transitory computer readable media of claim 17, wherein the set of conditions further comprises a condition relating to whether the map application has been closed for more than a threshold time before the reopening of the map application.

19. The non-transitory computer readable media of claim 17, wherein the set of conditions further comprises whether the map application has moved to a location that is not on the first map while the map application was closed.

20. The non-transitory computer readable media of claim 17, wherein the set of conditions further comprises whether a location represented by the first map was less than a threshold distance away from the mobile device when the map application was closed.

* * * * *